Patented Aug. 7, 1923.

1,463,794

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

ACCELERATION OF VULCANIZATION AND PRODUCTS OBTAINED THEREBY.

No Drawing.     Application filed July 13, 1922. Serial No. 574,797.

*To all whom it may concern:*

Be it known that I, SIDNEY M. CADWELL, a citizen of the United States, residing in Leonia, county of Bergen, State of New Jersey, have invented certain new and useful Improvements in the Acceleration of Vulcanization and Products Obtained Thereby, of which the following is a full, clear, and exact description.

This invention relates to processes for vulcanizing rubber and is more particularly directed to the acceleration of vulcanization, and to the products obtained thereby.

In processes of vulcanization as heretofore carried out, rubber has been combined with vulcanizing and other ingredients ordinarily by heating and milling. Many active accelerators of vulcanization when heated with rubber for example in milling cause vulcanization so rapidly that during the process prevulcanization takes place. Some of the more rapid accelerators are addition products of amines and carbon disulphide, among which are included substances which are apt to prevulcanize, and certain of these compounds are unstable breaking down upon storage and losing a part or all of their ability to accelerate. Furthermore, with the exception of piperidinepiperidyldithiocarbamate set forth in United States patent to Ostromislensky, No. 1,342,457, these addition products of amines and carbon disulphide have been known only as accelerators of vulcanization performed at 240° F. or above the temperature range usually employed for hot vulcanization.

This application is a continuation in part of my co-pending application Serial No. 471,933, filed May 23, 1921, which is a continuation in part of my application Serial No. 374,275, filed April 16, 1920.

One of the objects of the invention accordingly is to provide a process which may be carried out at ordinary temperature, approximately 70° F. or above including the normal hot vulcanization temperature ranging from approximately 240–286° F. Another object of the invention is to provide a process of the kind described employing amines in conjunction with carbon disulphide which shall permit the use of even those amines which form unstable compounds with carbon disulphide. Another object of the invention is to provide such a process in which by eliminating the production of a compound of carbon disulphide and amines outside of the rubber and combination of this compound with the rubber subsequently shall effect an economy in operations. Another object of the invention is to provide a process of the kind mentioned which shall permit vulcanization to be carried out in masses of rubber, in thin sheets or in cements while avoiding the generation of acids during the process of vulcanization, as for example takes place when sulphur chloride is used. Another object of the invention is to provide a series of products having desirable physical characteristics in accordance with beneficial results secured by the practice of the process.

The invention accordingly consists of a process for treating rubber which comprises combining with rubber a vulcanizing agent, a metal M in combination, carbon disulphide and a primary or secondary amine, the carbon disulphide and amine being combined with the rubber as separate materials with respect to one another, and vulcanizing the rubber.

The metal M which is employed in combination is preferably zinc for vulcanization at any temperature. M preferably represents either zinc or mercury in the mercuric state when vulcanization at ordinary temperatures is carried out, and when vulcanization above ordinary temperatures, the preferred metals are the following: zinc, mercury, preferably in the mercuric state, lead, preferably in the plumbous state, cadmium, copper, preferably in the cupric state, arsenic, preferably in the arsenous state, manganese, preferably in the manganous state.

In carrying out the invention in its preferred form, 100 parts of rubber, 10 parts of zinc oxide, 3 parts of sulphur and 2 parts of dibenzyl amine are mixed in any desired manner, for example by milling. After combination of the materials any desired shape may be given thereto whereupon the shaped compounded rubber is painted four times at five minute intervals with carbon disulphide and allowed to stand for say 3 hrs. at ordinary temperatures where the thickness of the shaped material is approximately one-quarter inch. In the course of three hours for a sheet of the thickness mentioned the carbon disulphide penetrates throughout the mass. Thereafter if the material is maintained at a temperature of 140° F. for 12 to 14 hrs. vulcanization is accomplished. On the other hand if the article is allowed to stand for one week at ordinary temperatures, approximately 70° F., vulcanization is accomplished. Or if desired the article after painting with carbon disulphide may be placed in a mold and heated for 15 minutes under a steam pressure of approximately 40 lbs. per square inch whereupon vulcanization is secured.

This procedure corresponds it will be observed to that set forth in my copending application Serial No. 441,691, filed Feb. 1, 1921.

As another example in carrying out the process a mass of rubber containing materials mentioned above, namely, 100 parts of rubber, 10 parts of zinc oxide, 3 parts of sulphur, 2 parts of dibenzylamine in the form of a sheet or other article having say a thickness of one-quarter inch is placed in a closed vulcanizer and heated to 180–200° F. Preferably an amount of carbon tetrachloride equal to 3 cc. of liquid per cubic foot of vulcanizing space is vaporized and introduced into the vulcanizer. A liquid containing one volume of carbon disulphide mixed with two volumes of carbon tetrachloride is now vaporized and introduced into the vulcanizer. The combined vapors introduced into the heated vulcanizer are preferably present in amounts corresponding to approximately 7 cc. of liquid per cubic foot of the vulcanizer space. The vulcanizer and contents are maintained at 180–200° F. for 2 to 3 hrs. and thereupon if residual gases remain they are blown out through a suitable absorption apparatus and the rubber is removed from the vulcanizer. The rubber after such treatment will be found to be completely vulcanized on the surface and vulcanization on the interior will proceed and complete itself in the course of a week approximately at ordinary temperatures. Carbon disulphide may be employed alone or mixed with any other substance than carbon tetrachloride to render it non-inflammable. For example, carbon dioxide, nitrogen, products of combustion etc. or other non-inflammable relatively inert gases may be employed to replace carbon tetrachloride vapor. The introduction of carbon disulphide into the rubber from an atmosphere containing carbon disulphide as a gas may be accomplished at the normal or any other desired temperature. On the other hand if desired the article may be dipped in carbon disulphide, diluted or undiluted.

As another example in carrying out the process of the invention, a mass of rubber, approximately one-quarter of an inch thick, containing materials in the following proportions:

100 parts of rubber
150 parts of zinc oxide
60 parts of sulphur
10 parts of dibenzyl amine.

is painted four times at five minute intervals with carbon disulphide and allowed to stand for three hours. The mixture is thereupon placed in a mold and heated for 30 minutes at 40 lbs. steam pressure whereupon it is converted into hard rubber. It may also be converted into hard rubber by heating for 14 hrs. approximately at 212° F. in open air.

Alternatively 100 parts of rubber, 10 parts of zinc oxide, 3 parts of sulphur, 5 parts of benzylamine and 5 parts of carbon disulphide are mixed on cold rolls in the usual manner. Care should be taken to avoid loss by evaporation of carbon disulphide during the mixing. This loss may be ordinarily avoided by preventing excessive heating of the rubber on the rolls. After removal from the rolls the rubber so compounded will vulcanize at ordinary temperatures in the course of 48 hours. Vulcanization may be accomplished at higher temperatures in a relatively shorter time. For example, a sheet of rubber, compounded as described, having a thickness of approximately $\frac{1}{8}''$ vulcanizes at 212° F. approximately in 20 minutes. Normal hot vulcanization temperatures ranging from 240° F.–284° F. or above may be employed in carrying out the process.

Instead of mixing the accelerating material with the rubber on mill rolls as indicated above, a cement may be prepared containing all of the ingredients, where it is desired to proceed directly with the vulcanization. On the other hand if it is preferred to delay vulcanization after the preparation of a cement, two portions of cement may be prepared to one of which is added carbon disulphide and to the other an amine. When the two portions are brought together thereafter vulcanization will occur.

As examples of the methods of accelerating the vulcanization of cements respectively according to the two procedures mentioned in the last paragraph, the following methods may be employed:

*Where all ingredients are mixed together.*—100 parts of rubber, 10 parts of zinc oxide, 3 parts of sulphur, 800 parts of benzol, 5 parts of benzylamine, 5 parts of carbon disulphide are mixed together to form a cement. This cement if allowed to stand will vulcanize in approximately 48 hrs. at ordinary room temperature.

*Where the cement is applied in two portions.*—800 parts of benzol, 100 parts of rubber, 10 parts of zinc oxide, and 3 parts of sulphur are mixed and divided into two portions. To one portion 5 parts of benzylamine and to the other portion 5 parts of carbon disulphide are added. In order that the portion containing benzylamine should not prevulcanize at ordinary temperature the benzol employed should be preferably substantially free from carbon disulphide. When it is desired to apply the cements, equal parts of each portion should be mixed. Vulcanization will then occur at ordinary room temperature in the course of 48 hrs. approximately.

It has been found in general in accordance with the preferred embodiment of this invention set forth above that various primary and secondary, aliphatic, aromatic or hetero cyclic amines may be employed with carbon disulphide or carbon oxysulphide to accelerate vulcanization. Among such substances are the following: diethylamine, dimethylamine, methylamine, benzylamine, piperidine, aniline, para toluidine, and triethyltrimethylenetriamine, and tribenzyltrimethylenetriamine, which apparently dissociate to form a primary or secondary amine. It will be noted that these amines being either primary or secondary amines have a replaceable ammoniacal hydrogen.

It will be noted that in accordance with the examples given above the process may be carried out at any desired temperature, permitting vulcanization at ordinary room temperature, if desired. The introduction of carbon disulphide into rubber containing amines avoids the necessity for forming the amine carbon disulphide compound outside the rubber and thus effects an economy. The process constituting the invention may be carried out in thin or thick masses of rubber or cements as indicated. The process as carried out, it will be observed, permits the use of amines which ordinarily provide unstable compounds when combined with carbon disulphide. For example, the compound of carbon disulphide and benzylamine when made separately constitutes an unstable compound which is apt to decompose on standing. The products obtained possess in general the desirable physical characteristics of well vulcanized rubber, that is, resistance to ageing, resistance to flexing, good tensile strength, etc. It will thus be seen that among others the objects of the invention above enumerated are achieved.

Materials which are ordinarily classed under the term "rubber" including balata, gutta percha, synthetic rubber, may be similarly employed in carrying out the invention, and it is intended to include such substances by the term rubber as herein employed.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for treating rubber or similar material which comprises combining with rubber a vulcanizing agent, a metal M, carbon disulphide and an amine having a replaceable ammoniacal hydrogen, the carbon disulphide and amine being combined with the rubber as separate materials, with respect to one another, and vulcanizing the rubber.

2. A process for treating rubber or similar material which comprises combining with rubber a vulcanizing agent, a metal M, carbon disulphide and an aliphatic amine having a replaceable ammoniacal hydrogen, the carbon disulphide and amine being combined with the rubber as separate materials, with respect to one another, and vulcanizing the rubber.

3. A process for treating rubber or similar material which comprises combining with rubber a vulcanizing agent, zinc in combination, carbon disulphide and an aliphatic amine having a replaceable ammoniacal hydrogen, the carbon disulphide and amine being combined with the rubber as separate materials, with respect to one another, and vulcanizing the rubber.

4. A process for treating rubber or similar material which comprises combining with rubber a vuclanizing agent, zinc in combination, carbon disulphide and an aromatic amine having a replaceable ammoniacal hydrogen, the carbon disulphide and amine being combined with the rubber as separate materials, with respect to one another, and vulcanizing the rubber.

5. A process for treating rubber or similar material which comprises combining with rubber sulphur, zinc in combination, carbon disulphide and a primary amine, the carbon disulphide and amine being combined with the rubber as separate materials, with respect to one another, and vulcanizing the rubber.

6. A process for treating rubber or similar material which comprises combining with rubber sulphur, zinc in combination carbon disulphide and benzyl amine, the carbon disulphide and benzyl amine being combined with the rubber as separate materials, with respect to one another, and vulcanizing the rubber.

7. A process for treating rubber or similar material which comprises mixing 10 parts of zinc oxide, 3 parts of sulphur, 5 parts of benzylamine and 5 parts of carbon disulphide with 100 parts of rubber, and allowing the resulting mixture to vulcanize at ordinary temperatures.

8. A process for treating rubber or similar material which comprises preparing a cement comprising a rubber solvent, a vulcanizing agent, zinc in combination, an amine having a replaceable ammoniacal hydrogen and carbon disulphide, the amine and carbon disulphide being combined with the rubber as separate materials, with respect to one another, and vulcanizing the rubber.

9. A process for treating rubber or similar material which comprises preparing a cement containing 100 parts of rubber, 10 parts of zinc oxide, 3 parts of sulphur, 800 parts of benzol, 5 parts of benzylamine, and 5 parts of carbon disulphide, and vulcanizing the rubber.

10. A step in a process for treating rubber or similar material which comprises combining a vulcanizing agent and an amine having a replaceable ammoniacal hydrogen with rubber and exposing the mixture to carbon disulphide.

11. A process for treating rubber or similar material which comprises preparing a mixture of 100 parts rubber, 10 parts zinc oxide, 3 parts sulphur, and 5 parts of benzylamine, and exposing the mixture to carbon disulphide at ordinary temperatures.

12. A process for treating rubber or similar material which comprises combining a vulcanizing agent, an amine having a replaceable ammoniacal hydrogen and zinc in combination with rubber, and exposing the mixture to a mixture of carbon disulphide vapor and a substance adapted to lower the inflammability of the carbon disulphide.

13. A process for treating rubber or similar material which comprises combining a vulcanizing agent, an amine having a replaceable ammoniacal hydrogen and zinc in combination with rubber, and exposing the mixture to a mixture of carbon disulphide vapor and a gas adapted to lower the inflammability of the carbon disulphide.

14. A process for treating rubber or similar material which comprises combining a vulcanizing agent, an amine having a replaceable ammoniacal hydrogen and zinc in combination with rubber, and exposing the mixture to a mixture of carbon disulphide vapor and a non-inflammable gas adapted to lower the inflammability of the carbon disulphide.

15. A process for treating rubber or similar material which comprises combining a vulcanizing agent, an amine having a replaceable ammoniacal hydrogen and zinc in combination with rubber, and exposing the mixture to a mixture of carbon disulphide vapor and carbon tetrachloride adapted to lower the inflammability of the carbon disulphide.

16. As a new compound a vulcanized rubber derived from rubber combined with carbon disulphide, a vulcanizing agent, zinc in combination, and an amine having a replaceable ammoniacal hydrogen, the carbon disulphide and amine being combined with the rubber as separate materials, with respect to one another.

17. As a new compound a vulcanized rubber derived from rubber combined with carbon disulphide, a vulcanizing agent, zinc in combination and an aliphatic amine having a replaceable ammoniacal hydrogen, the carbon disulphide and amine being combined with the rubber as separate materials, with respect to one another.

18. As a new compound a vulcanized rubber derived from rubber combined with carbon disulphide, a vulcanizing agent, zinc in combination and an aromatic amine having a replaceable ammoniacal hydrogen, the carbon disulphide and amine being combined with the rubber as separate materials, with respect to one another.

19. As a new compound a vulcanized rubber derived from rubber combined with carbon disulphide, a vulcanizing agent, zinc in combination and a primary amine, the carbon disulphide and amine being combined as separate materials, with respect to one another.

20. As a new compound a vulcanized rubber derived from rubber combined with carbon disulphide, sulphur, zinc in combination and benzylamine, the carbon disulphide and amine being combined as separate materials, with respect to one another.

21. A process for treating rubber or similar material which comprises combining with rubber a vulcanizing agent, zinc in combination, carbon disulphide and an amine having a replaceable ammoniacal hydrogen, the carbon disulphide and amine being combined with the rubber as separate materials, with respect to one another, and vulcanizing the rubber below the normal hot vulcanization temperature.

22. A process for treating rubber or similar material which comprises combining a vulcanizing agent and an amine having a replaceable ammoniacal hydrogen with rubber, exposing the mixture to carbon disulphide below the normal hot vulcanization temperature, and vulcanizing the rubber.

23. As a new compound a rubber vulcanized below the normal hot vulcanization temperature derived from rubber or similar material combined with a vulcanizing agent, a bivalent metal, carbon disulphide and an amine having a replaceable ammoniacal hydrogen, the carbon disulphide and amine being combined with the rubber as separate materials, with respect to one another.

24. As a new compound vulcanized rubber derived from rubber or similar material combined with a vulcanizing agent, zinc in combination and an amine having a replaceable ammoniacal hydrogen, the combination being exposed to carbon disulphide at a temperature below the normal hot vulcanization temperature.

25. A process for vulcanizing rubber or similar materials which comprises mixing rubber, zinc in combination, sulphur and dibenzylamine, exposing the combination to carbon disulphide, and allowing it to stand at ordinary temperature to accomplish vulcanization.

Signed at New York, New York, this 12 day of July, 1922.

SIDNEY M. CADWELL.